Oct. 27, 1959 W. J. PARKS 2,910,180
SCREEN DECK STRUCTURE
Filed March 7, 1955 4 Sheets-Sheet 1
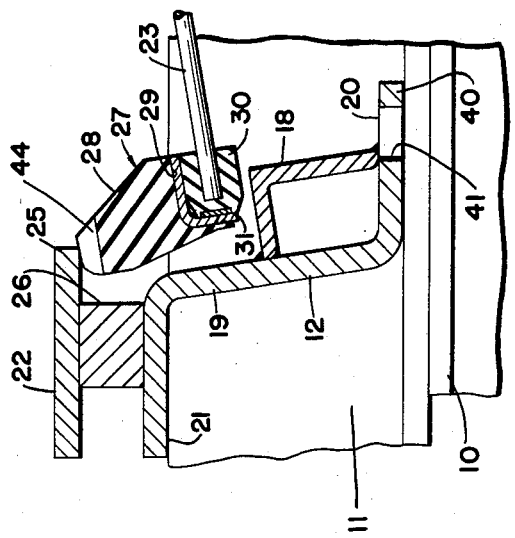
FIG. 2
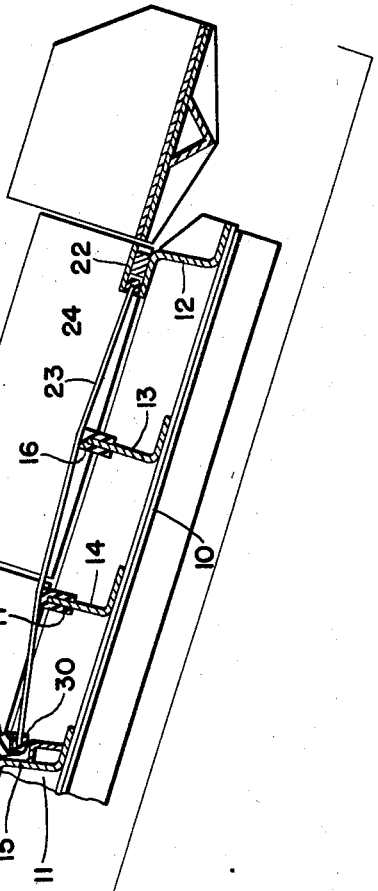
FIG. 1
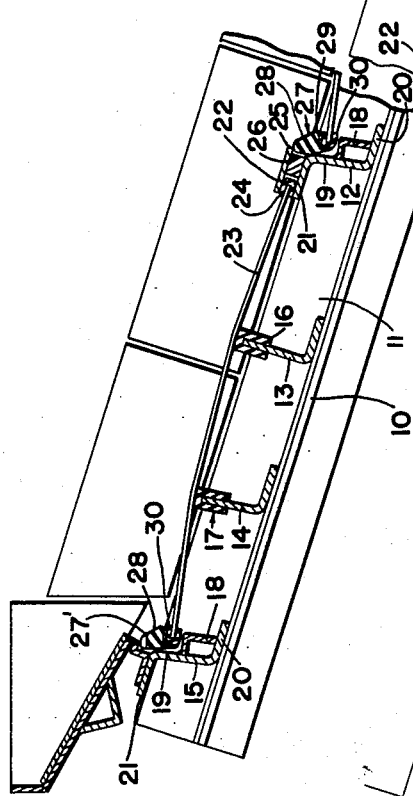
*INVENTOR.*
WALTER J. PARKS
BY *Fay & Fay*
ATTORNEYS

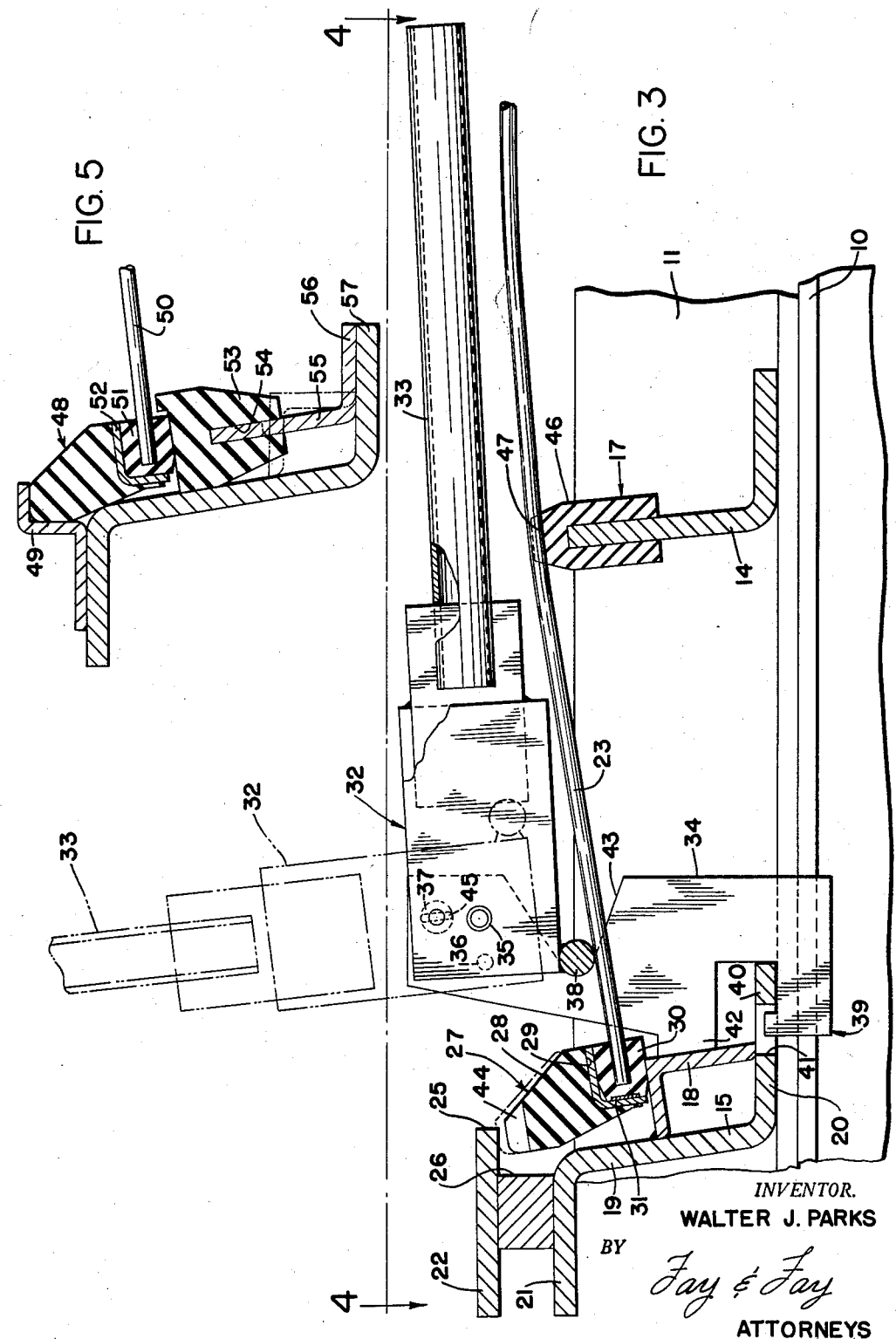

Oct. 27, 1959     W. J. PARKS     2,910,180
SCREEN DECK STRUCTURE
Filed March 7, 1955     4 Sheets-Sheet 3
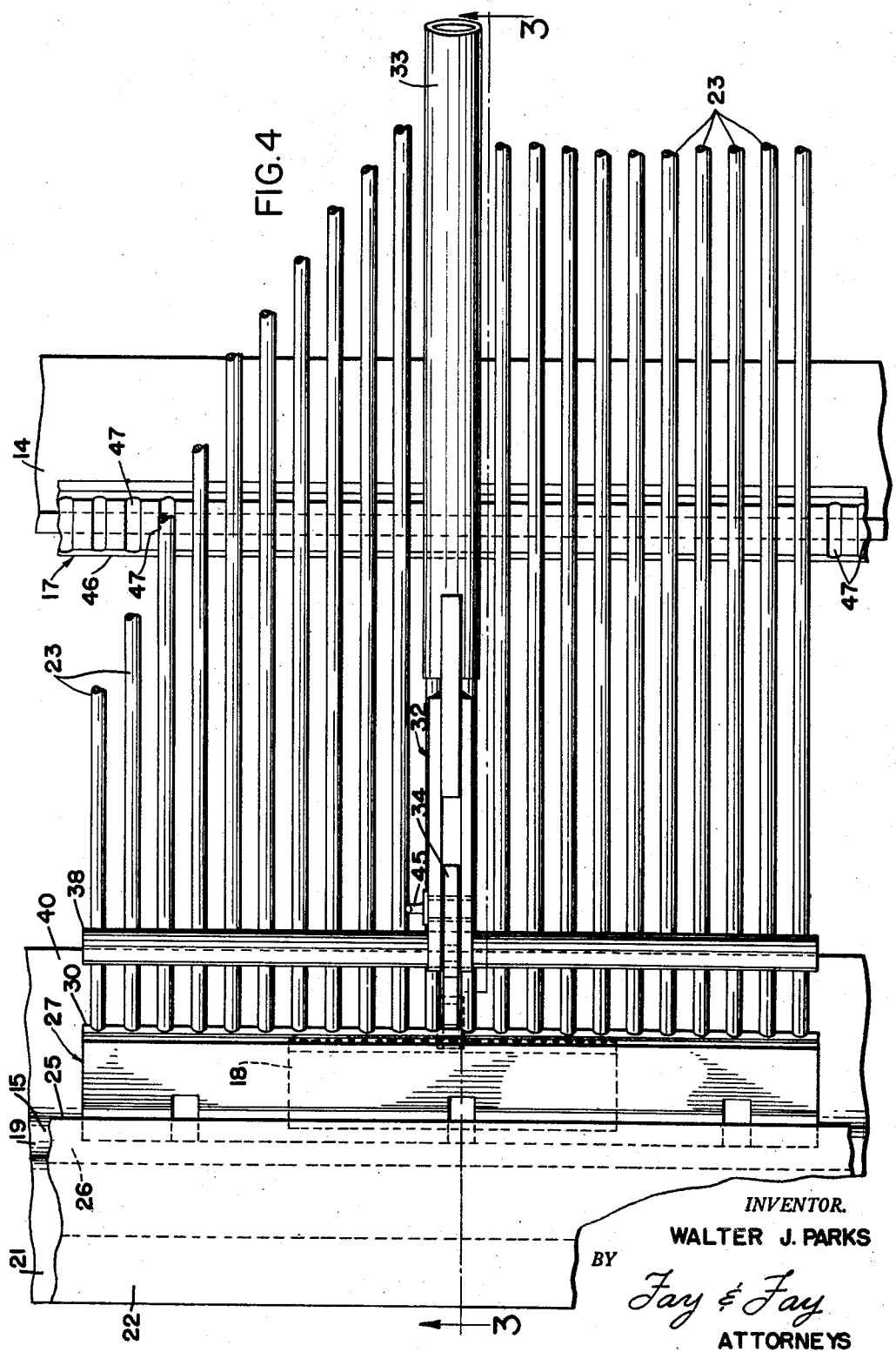
INVENTOR.
WALTER J. PARKS
BY
*Fay & Fay*
ATTORNEYS Oct. 27, 1959

W. J. PARKS 2,910,180

SCREEN DECK STRUCTURE

Filed March 7, 1955

INVENTOR.
WALTER J. PARKS

BY

*Fay & Fay*
ATTORNEYS

United States Patent Office 2,910,180
Patented Oct. 27, 1959

2,910,180

SCREEN DECK STRUCTURE

Walter J. Parks, Cleveland, Ohio, assignor to The W. S. Tyler Company, Cleveland, Ohio, a corporation of Ohio Application March 7, 1955, Serial No. 492,675

5 Claims. (Cl. 209—395)

This invention, relating as indicated to a screen deck structure for vibrating screening apparatus, is particularly adapted to be sectionally mounted, quickly removable and characterized by its flexibility of arrangement permitting incorporation of necessary elements for increasing screening efficiency and durability of the structure. This adaptability readily permits the use of easily obtainable materials of the exact properties needed, such as hardness, toughness and resistance to corrosion.

Further, this invention relates to an apparatus and a tool for assembling said screen deck structure in a vibrating screening apparatus.

In various types of vibrating screening apparatus, in which the apparatus or screen deck is vibrated or gyrated, there are needs for new types of screen deck structures. These decks are frequently made from woven wire strands of various types of materials resistant to the characteristics of the products being screened. Sometimes it is required that they be resistant to corrosion; other times to abrasion, and have various amounts of temper and the like. To get a screen deck structure that has the toughness characteristics that are required to withstand the constant vibration, as well as those that have the characteristic hardness on the exterior, is sometimes difficult. Certain types of rods when woven under and over will fracture in the weaving operation, and cannot be hardened adequately following weaving. In other cases said hardening operation does not produce the desired characteristics, or is too expensive.

This invention particularly relates to a screen deck structure employing rods, or in the alternative, perforated plates or woven wire or rod screen sections, having characteristics of flexibility in the rods, perforated plate or woven wire or rod screen sections but having exterior conditions and hardness that permit the structure to resist the abrasion of particles passing therethrough.

To avoid needless repetition in further description of the feature of the invention, the actual screening media as described above as perforated plate, woven wire, or rods, will be covered in general by the term "screening element."

To further shorten the description, it will be mentioned that while the method of inserting and locking the screening element in place could be applied to a single narrow element of rod, or rods, plate or woven screen section, it is, in general, the intent of this invention to so assemble or cut the screening element that it can be applied as a section covering a convenient portion or segment of the screening deck. For this purpose, where individual rods are used, a subassembly of several or more rods is first made.

The structure further relates to a mounting structure for a screening element in the vibrating apparatus wherein the screening element is so positioned over and under supporting and restraining members in an arcuate or cambered shape that the spring forces tending to return it to its originally different shape hold it firmly against displacement by virtue of the movement of the vibrating body or the impact of the material being screened on the element. To establish the necessary spring force in the screening element by bending, a substantially equivalent force must be applied at the end of the screen element in installation. While it is possible that on very light structural materials this could be done by hand pressing or weighting the end, it is, in general, true that the stiffness of the section would require the use of a tool giving a substantial mechanical advantage to the operator. This tool will be subsequently described.

The design and shape of the supporting structural members may be such that the arcuate or cambered shape of the screening element may run transversely or longitudinally of the deck surface, assuming that the flow of the material being treated is longitudinally of the deck.

It is, in general, preferable that the ends of the screen element that are seated in the restraining members be provided with rubber coverings, molded on or separable from the section to prevent abrasive wear, seal the joints and prevent noise from vibration. There are some cases where rubber, natural or synthetic, would not be applicable and would have to be omitted.

The arcuate or cambered shape of the screening element when installed is created and maintained by structural members at an optimum elevation intermediate of the ends of the element and supporting and restraining members at the ends of the section. One end may have a member fixed in position, such as a slot or ledge, while the other end is held and located in a slot or ledge, constructed with a removable section that is inserted to lock the screen element in place when installing and is removed to permit its removal. This removable section, retaining block or wedge may be of solid material, such as wood or steel, or may be a resilient elastomer product of rubber-like characteristics. If the latter, there will be some spring back under the spring force of the screen element. This is desirable in many cases.

In some extreme cases, particularly where this deck is subjected to the severe impact of heavy lumps or loads of material, it is necessary to provide a lower ledge under both ends of the screen element. At the end of the section provided with a removable wedge block this will require special elements, particularly when a rubber or similarly springy block is used, as in this case, it is advantageous when installing the screen element to depress the ends low enough to insert the block and it will then deflect upward. In this case it is desirable to make the lower ledge also of a springy material, such as rubber, so that it can be compressed and will also spring back and retain contact with the underside of the screen element when the upper block compresses under the spring loading of the element.

It is pertinent to note that where the screen element is composed of rods that are spaced by means of openings in the end holders of rubber or other materials that the intermediate members are provided with similarly spaced holes or slots to maintain an accurate spacing of the rods.

Also, when the arcuate or cambered shape of the screen element runs longitudinally of the screen deck, then the supporting member provided with the removable wedge or retaining block will be toward the feed, or leading edge, of the element as compared to the direction of the flow of the material on the deck. This creates a substantial step in the surface which is advantageous in screening operations.

An object of this invention is to produce a new type of screen deck structure in which the screening element may be quickly and readily removed without lengthy downtimes of equipment, characterized by flexibility in the screening element and the absence of bolted or other screwed fittings in the assembly.

A further object of this invention is to produce a new type of screen deck structure including a screening element and a tool for quickly assembling said element in said deck structure or removing it as needed.

A further object of this invention is to produce a method of assembling a screen deck structure employing a flexible screen element which is bent, forming a camber, and has a block or wedge to hold the members in the bent or cambered position to permit ready assembly and disassembly.

In the drawings:

Fig. 1 is a fragmentary cross-sectional view through the screen deck structure of this invention;

Fig. 2 is an enlarged cross-sectional view of the screening element, the supporting members, and the rubber wedge or retaining blocks therebetween;

Fig. 3 is an enlarged cross-sectional view of the means for mounting said screening element in the screen deck structure, together with the tool for accomplishing the same;

Fig. 4 is a view along the lines 4—4 of Fig. 3, showing one modification of the screen deck structure and the tool in position for assembly;

Fig. 5 is an enlarged cross-sectional view of a modification of the wedge block of Fig. 2 showing a lower ledge for support;

Figure 6:
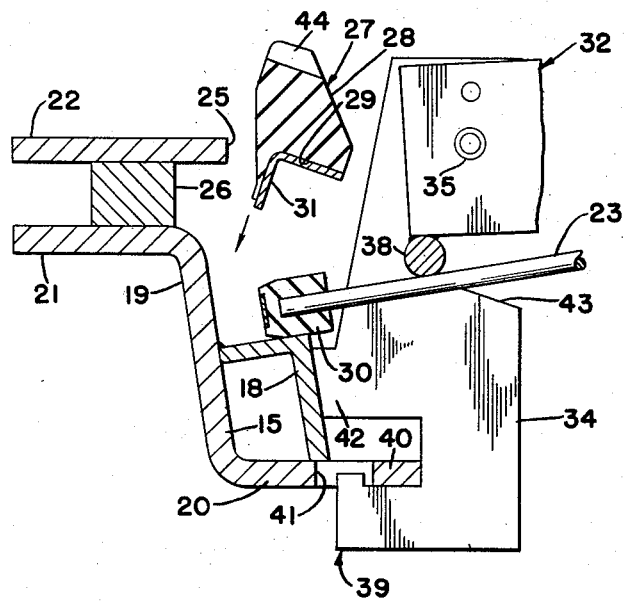
Fig. 6 is an exploded view of Fig. 5.

In the drawings 10 shows a side frame member for supporting a screen deck structure. 11 shows a side plate for said screen, and 12, 13, 14 and 15 are vertical support members horizontally disposed and secured to the side frame aforementioned. 13 and 14 are intermediate cross supports extending in the general vertical direction and having a rubber supporting block 16 and 17 in a channel shape around the end of the support. 12 is the lower end support means having a rest or stop member 18 in an angle between the vertical portion 19 of said member and the horizontal portion 20. The screen is built up into a series of cascade sections, and the end of each section is the beginning of the next section. The mounting structure on the flexible screen element would be slightly different. Continuation of the vertical portion 19 projects horizontally as shown at 21 and has a parallel member 22 forming an opening or slot therebetween for entrance of the screening elements and the resilient rubber mounting block. Said screening element is shown at 23 and rubber end support at 24.

The inherent characteristics of this construction are that there be some flexibility to the perforated screening elements as they must be bent in position so that they are held at their ends against vertical movement as well as longitudinal movement, but in order to be inserted it must be bowed to form a camber in the deck. Said vertical portion 19 acts as the rest for the next segment of the screening element. Said parallel flange 22 extends with an edge 25 so that there is a portion undercut shown at 26 forming a ledge against which the rubber wedge or block, soon to be described, may be positioned. This wedge or block shown at 27 is identical with that shown in the next segment at 28, and though the construction at the end is modified in minor details, it is substantially the same as shown in the center portion of Fig. 1. Said rubber wedge or retaining block is an elongated member having an angulated edge shown at 27′ and a bottom member which has a notch or V shown at 29. Said notch or V may have a metallic plate secured therein adapted to fit over the rubber end mounting means shown at 30. This is identical with the construction at 24. Said metal plate is shown at 31.

In connection with Fig. 3, the view of the components is enlarged again and shown in connection with the tool for installing the screen element, said tool shown generally at 32, and having a handle portion 33, and a contacting portion 34. These members are pivoted together as shown at 35 and have apertures in each of the members for positioning the handle and member 34 at fixed relationship. Said apertures are shown at 36 and 37. In dotted position the handle is shown when raised, releasing the tension from the screen. Transverse to the general plane of said handle and member 34 is a cross bar 38 that rests on and contacts the screening element across its full width. In essence, member 34 is a hook member having a hook portion, shown generally at 39, adapted to reach around a bar or plate member 40 in the screen deck structure itself, having an aperture therein 41. A positioning lug or member 42 keeps said hook in a fixed relationship with the screen deck structure so that it does not slip. Member 34 further has a notch or V 43, into which bar 38, which is fixedly secured to handle 33 slides. The operation of this tool in assembling and disassembling the screening element from the deck will be subsequently described, but it can be appreciated that by this means it will be indicated that the screening elements 23 can be fixed at one end into the slot or ledge between plates 21 and 22, and forced down by means of the tool just described, so that the block 27 may be positioned against the overhanging ledge 25 of the screen deck structure so that the screening element is fixed both in the vertical plane and the horizontal plane against movement. Notches 44 are positioned at intervals along the rubber mounting block 27 in order that a tool may readily be placed underneath ledge 25 to force out the rubber mounting block. Said block rotates in and out of the interval between ledge 25 and the angulated support member 18, when the tool depresses the screening element and holds it down. A pin member 45 is shown in one position in Fig. 4 and it can be moved to another pin to register with the apertures and hold the handle in fixed relationship to the screening elements. When they are formed of a multiplicity of rod members, spacing between the rods may be achieved by having the channel-shaped rubber member shown, as for example, at 46 with a multiplicity of apertures or slots therein, one of which is shown at 47, so that the bars will be fixedly positioned relative to one another at intervals along the rods. With apertured plates and woven screen cloth this might not be necessary.

Fig. 5 is a view of an alternate modification adapted for the handling of heavy lumps or loads of material. This provides a lower ledge or support under both ends of the screening elements. At one end there is provided a removable wedge or retaining block, shown herein at 48, a ledge 49 under which it is adapted to be fitted, screening elements being shown at 50 with a mounting means of rubber or mounting material shown at 51, and a plate member, such as steel, surrounding said end mounting means, shown at 52. Said support element is shown at 53 and adapted to be fitted by means of a slot shown at 54 over an angulated plate 55 to be secured by means of a support portion 56 to the frame member 57. In this instance, the rubber element 53 would be somewhat resilient and would be compressed in order to fit the screening elements 50 and mounting means 51 to permit admission of the wedge block 48. Loading of heavy materials may, under some conditions, depress the screening element but there would be a resilient support for these elements with this means.

Figure 7:
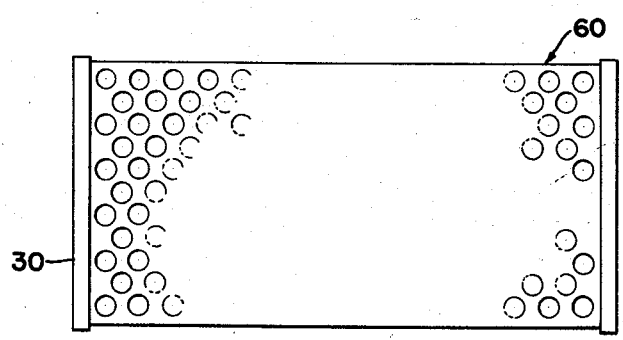
Fig. 7 is a view of a perforated plate adapted for use in this screening apparatus.
Figure 8:
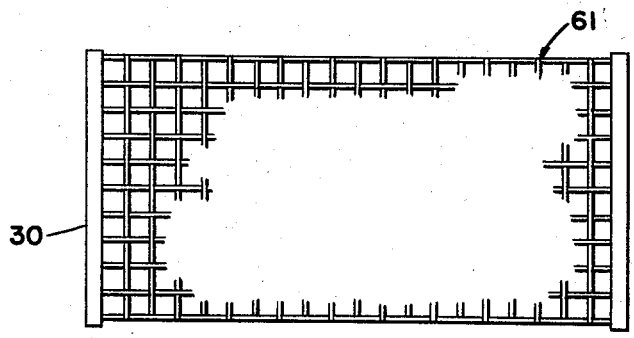
Fig. 8 is a view of a woven wire screen adapted for use in this screening apparatus.

Fig. 6 is a view of Fig. 5 in exploded form, showing the rubber wedge or retaining block 48 removed from its position in the assembled screen deck structure. Fig. 7 is a view of a perforated plate 60 which might be used in place of the rod-like, flexible screening element, and Fig. 8 shows at 61 a woven wire screen which might be used as a segment of this screen deck structure.

Thus it will be seen from the foregoing that the vibrating screening apparatus, of typical construction, has mounted therein several cross members, one of said cross members forming a ledge, and other of said cross members being of similar construction. The screen element itself may be, and most frequently probably would be, a plurality of rods assembled in parallel relationship with a desired screening spacing. Said rods may be circular, rectangular, or trapezoidal. Said rods are mounted, for convenience, in an end rubber mounting block and the total assembly is somewhat less than the opening in which they are to be mounted. Cross support members are provided, either on the same level or above the level of said cross members. The screen element is placed underneath said ledge member on one end, and is forced down on the other end, because of the flexibility of the screening elements. Between said lowered end and the overhanging ledge a block or wedge, preferably a resilient rubber member is placed. Said resilient member comprises a wedge construction having a notch or V-shaped end adapted to fit over the resilient rubber end of the screen deck structure, and hold it both against vertical and longitudinal movement. In this manner the deck structure is wedged and there is a slight camber to the deck. Said camber may be either longitudinally or transverse of the deck. The screen is then securely held in place and may be quickly removed from the deck. This is important in connection with certain processes, as the downtime of a plant is very costly, and the length of time which it takes to remove and replace the decks is an important factor in their operation.

*Operation*

In operation a screen element is installed by inserting one end of the element, which preferably would have an elastomer or resilient covering, underneath a plate, ledge, or L-shaped member that is approximately parallel to the level of the deck and over a plurality of cross members which generally would be about or above the level of said end cross member and possibly have a channel-shaped covering over a steel support. These would rest against the screening element. The other end of said element would be similarly cased in a resilient material, and the length of this would be just short of the spacing that is provided in the deck, that is to say, that the deck would fit within the spacing and could not be held except by means of an end support member. In order to put said end support member in, the deck is flexed, since it is characterized by some springiness, to below the end plate, which is a cross plate about on the level of the deck. After being flexed to beneath this plate, a wedged block is placed underneath the end plate and against the end of the screen element itself. Generally, there would be a metallic supporting member secured to said rubber wedge, to provide against horizontal as well as vertical movement, so that the screen element would not shift in operation. By this construction the deck is cambered, and held at each end, and is tightly fitting over the cross support members. Perhaps a normal screen of from three to fifteen feet in width would have one, or as many as six or eight of these screen decks individually placed for ease in handling.

*Installation tool*

The installation tool for assembling these decks comprises a hook member adapted to fit through the rods or screen in such a manner that it will grab a plate spaced beneath the deck. It comprises a plate member which has an aperture therein and a second member comprising a handle. Said second member has connected thereto a crossbar so that pressure on the upper member causes the crossbar to contact the top surface of the screen element comprised of rods or woven structural material, to force said deck downwardly a distance sufficient to permit a lock or crosspin to be fitted through apertures in the overlapping members comprising the handle and the hook member, to hold the plates in either the up or the down position to permit manipulation of the rubber wedge block.

Although the present invention in a screen deck structure and a tool for quickly manipulating said structure has been described in connection with a few preferred embodiments thereof, variations and modifications may be resorted to by those skilled in the art without departing from the principle of the invention in a screen deck structure. All of these variations, including those with regard to the type of screening elements, either parallel rods, woven cloth or a perforated plate, as modifications are considered to be within the true spirit and scope of the present invention as disclosed in the foregoing description and defined by the appended claims.

I claim:

1. A screen deck structure for a vibrating screen apparatus comprising a pair of spaced apart end plates having edges facing one another and parallel to one another, said plates being substantially in the same plane, at least one cross support in the plane of said end plates, a flexible screening element substantially corresponding to the distance between the edges of said end plates, a removable retaining block parallel to one of said end plates adapted to hold the flexible screening element in position, whereby the flexible screening element is positioned with one end under one end plate, with its middle over the cross support and cambered, the opposite end being secured with the retaining block under the opposite end plate for ready removability of the retaining block and flexible screening element.

2. The screen deck structure of claim 1, in which the flexible screen deck is a woven structural material.

3. The screen deck structure of claim 1, in which the flexible screen deck is a perforated plate.

4. The screen deck structure of claim 1, in which the flexible screen deck is a multiplicity of parallel rods mounted in a mounting means at the ends thereof.

5. A screen deck structure for a vibrating screening apparatus comprising a pair of spaced apart end plates having edges facing one another and parallel to one another, said plates being in the same plane, at least one cross support in the plane of said end plates, a flexible screening element substantially corresponding to the distance between the edges of said end plates, a removable retaining block parallel to one of said end plates adapted to held the flexible screening element in position, and a resilient support for one end of said flexible screening element, whereby the flexible screening element is positioned with one end under one end plate with its middle over the cross support and cambered, the opposite end being secured against the resilient support and being held by the retaining block under the opposite end plate for ready removability of the retaining block and flexible screening element.

References Cited in the file of this patent

UNITED STATES PATENTS

| Number | Name | Date |
|---|---|---|
| 208,773 | Tyson | Oct. 8, 1878 |
| 1,434,437 | Hodgkins | Nov. 7, 1922 |
| 1,937,486 | Demers | Nov. 28, 1933 |
| 2,172,551 | Symons | Sept. 12, 1939 |
| 2,374,775 | Parks | May 1, 1945 |
| 2,456,075 | Newhouse | Dec. 14, 1948 |
| 2,540,388 | Dreeben | Feb. 6, 1951 |
| 2,636,607 | Roubal | Apr. 28, 1953 |
| 2,703,649 | Cheyette | Mar. 8, 1955 |
| 2,790,552 | Symons | Apr. 30, 1957 |